United States Patent [19]
Bigus et al.

[11] Patent Number: 6,085,178
[45] Date of Patent: Jul. 4, 2000

[54] APPARATUS AND METHOD FOR COMMUNICATING BETWEEN AN INTELLIGENT AGENT AND CLIENT COMPUTER PROCESS USING DISGUISED MESSAGES

[75] Inventors: Joseph Phillip Bigus; Brian John Cragun; Helen Roxlo Delp, all of Rochester, Minn.

[73] Assignee: International Business Machines Corporation, Armonk, N.Y.

[21] Appl. No.: 08/822,119

[22] Filed: Mar. 21, 1997

[51] Int. Cl.[7] .................................................. G06F 13/00
[52] U.S. Cl. ............................... 705/80; 705/50; 380/56; 380/59; 283/17; 283/56; 283/73; 283/901
[58] Field of Search ..................... 395/200.32; 706/25; 380/25, 3, 21, 56, 59; 705/50, 80; 283/17, 56, 73, 901

[56] References Cited

U.S. PATENT DOCUMENTS

| | | | |
|---|---|---|---|
| 4,881,263 | 11/1989 | Herbison et al. | 380/21 |
| 4,914,585 | 4/1990 | Packard et al. | 364/200 |
| 5,073,890 | 12/1991 | Danielsen | 370/58.2 |
| 5,117,496 | 5/1992 | Stearns et al. | 395/700 |
| 5,155,763 | 10/1992 | Bigus et al. | 379/113 |
| 5,226,176 | 7/1993 | Westaway et al. | 395/800 |
| 5,235,642 | 8/1993 | Wobber et al. | 380/25 |
| 5,241,621 | 8/1993 | Smart | 395/51 |
| 5,276,768 | 1/1994 | Bander | 395/10 |
| 5,301,320 | 4/1994 | McAtee et al. | 395/650 |
| 5,317,688 | 5/1994 | Watson et al. | 395/161 |
| 5,325,528 | 6/1994 | Klein | 395/650 |
| 5,329,626 | 7/1994 | Klein et al. | 395/375 |
| 5,355,444 | 10/1994 | Chirico | 706/45 |
| 5,367,454 | 11/1994 | Kawamoto et al. | 364/419.2 |
| 5,367,635 | 11/1994 | Bauer et al. | 395/200 |
| 5,371,889 | 12/1994 | Klein | 395/650 |
| 5,392,345 | 2/1995 | Otto | 379/265 |
| 5,398,012 | 3/1995 | Derby et al. | 340/825.03 |
| 5,408,470 | 4/1995 | Rothrock et al. | 370/62 |
| 5,421,013 | 5/1995 | Smith | 395/650 |
| 5,423,043 | 6/1995 | Fitzpatrick et al. | 395/700 |
| 5,465,286 | 11/1995 | Clare et al. | 379/34 |

(List continued on next page.)

FOREIGN PATENT DOCUMENTS

| | | |
|---|---|---|
| 2061117 | 2/1992 | Canada . |
| 0519109A1 | 12/1992 | European Pat. Off. . |
| 0589249A2 | 3/1994 | European Pat. Off. . |
| 0598534A1 | 5/1994 | European Pat. Off. . |
| 0611210A1 | 8/1994 | European Pat. Off. . |
| 3195141 | of 1991 | Japan . |
| 4157944 | of 1992 | Japan . |
| 4256101 | of 1992 | Japan . |
| 5324009 | of 1993 | Japan . |
| 6175944 | of 1994 | Japan . |
| WO9321586 | 10/1993 | WIPO . |
| WO9500907 | 1/1995 | WIPO . |
| WO9502217 | 1/1995 | WIPO . |
| WO9511560 | 4/1995 | WIPO . |
| WO9515635 | 6/1995 | WIPO . |

OTHER PUBLICATIONS

Chavez, A. and Maes, P., "Kasbah: An Agent Marketplace for Buying and Selling Goods", *Proceedings of the First International Conference on the Practical Application of Intelligent Agents and Multi–Agent Technology*, Blackpool, U.K.: Practical Application Company, (Apr. 1996), pp. 75–90.

(List continued on next page.)

*Primary Examiner*—Emanuel Todd Voeltz
*Assistant Examiner*—Raquel Aluarez
*Attorney, Agent, or Firm*—Wood, Herron & Evans L.L.P.

[57] ABSTRACT

An intelligent agent and its client communicate using a selector known by both parties to generate and interpret messages and thereby effectively disguise confidential information transmitted in the messages from third parties. Moreover, a neural network is used to implement the decision logic and/or the message disguising functions of an agent such that the logic employed in such functions is not readily reverse compiled or scanned by third parties.

33 Claims, 7 Drawing Sheets

U.S. PATENT DOCUMENTS

| | | | |
|---|---|---|---|
| 5,469,562 | 11/1995 | Saether | 395/182.18 |
| 5,481,699 | 1/1996 | Saether | 395/182.13 |
| 5,481,715 | 1/1996 | Hamilton et al. | 395/700 |
| 5,603,031 | 2/1997 | White et al. | 395/683 |
| 5,644,727 | 7/1997 | Atkins | 705/40 |
| 5,646,998 | 7/1997 | Stambler | 380/25 |
| 5,715,312 | 2/1998 | Ijtsma | 380/3 |
| 5,717,989 | 2/1998 | Tozzoli et al. | 705/37 |
| 5,761,663 | 6/1998 | Lagarde et al. | 707/10 |
| 5,765,028 | 6/1998 | Gladden | 706/25 |
| 5,790,789 | 8/1998 | Suarez | 395/200.32 |

OTHER PUBLICATIONS

Koza, John R., *Genetic Programming: On the Programming of Computers By Means of Natural Selection*, The MIT Press, 1992.

Maes, Pattie, *Software Agents*, MIT Media Lab Slides 1, 3, 5–9, 13, 15–16, 18, 20, 22–26, 35–37, 42, 47–52, 54–56, 58–67, 71, 77, 80–82, 86, 101–102, 133, 136, and 144, presented in Chicago, 1997.

Giorgios, Zacharia and Maes, Pattie, *MIT Media Lab: Software Agents Group: Projects*.

David Kahn, The Codebreakers, pp. 224–229, May 1996.

Tuomas Sandholm et al. "Issues in Automated Negotiation and Electronic Commerce: Extending the Contract Net Framework", First International Conference on Multi–Agent Systems, (Jun. 1995), pp. 328–335.

Database 636 (IAC Newsletter) on Dialog, No. 3263922, "General Magic attempts to pull Glory from Web Hat", Network Briefing, (Jul. 19, 1996), 2 pages.

Database 148 (IAC Trade & Industry Database), No. 4056305, Katy Ring, "Neural Networks, knowledge systems, genetic algorithms at Cambridge Consultants", Computergram International, (Jul. 17, 1989), 3 pages.

Selker, Ted, "Coach: A Teaching Agent that Learns", *Communications of the Association for Computing Machinery*, vol. 37, No. 7, (Jul. 1996), pp. 92–99.

Gregory E. Kersten et al., "Negotiation in Distributed Artificial Intelligence: Drawing from Human Experience", *Proceedings of the Twenty–Seventh Annual Hawaii International Conference on System Sciences*, (1994), pp. 258–270.

Jim R. Oliver, "On Artificial Agents for Negotiation in Electronic Commerce", *Proceedings of the 29th Annual Hawaii International Conference on System Sciences*, (1996), p. 337–346.

Edward A. Billard, "Effects of Group Size on Goal–Directed Agents in Distributed Environments", IEEE Publication No. 0–7803–2559–1/95, (1995), pp. 3403–3408.

Gilbert et al., "IBM Intelligent Agents", http://www.networking.ibm.com/iag/iagwp1.html, (1996).

"Commerical Expert System Shells", http://www.ioe.ac.uk/hgm/expert3.html, (1997).

"Commercial Software Packages for Neural Network Simulation", ftp://ftp.sas.com/pub/neural/FAQ6.html, (1997).

G. Kersten et al., "Negotiation in Distributed Artificial intelligence: Drawing from Human Experience," IEEE, 1994, pp. 258–269.

J. Oliver, "On Artificial Agents for Negotiation in Electronic Commerce," IEEE, 1996, pp. 337–345.

E. Billard, "Effects of Group Size on Goal–Directed Agents in Distributed Environments," IEEE, 1995, pp. 3403–3408.

A.D. Kwok et al, "A Development System for Intelligent Agent Manufacturing Software," Integrated Manufacturing Systems, 1994, vol. 5, No. 4/5, pp. 64–76.

Barbara Hayes–Roth, "An architecture for adaptive intelligent systems," Artificial Intelligence, Jan. 1995, vol. 72, Nos. 1–2, pp. 329–365.

Siegfried R. Bocionek, "Agent systems that negotiate and learn," International Journal of Human–Computer Studies, Mar. 1995, vol. 42, No. 3, pp. 265–288.

Darrell Woelk et al, "Uncovering the next generation of active objects," OBJECT magazine, Jul./Aug. 1995, pp. 32–40.

Jan Ozer, "Totally Streaming Multimedia," CD–ROM Professional, Aug. 1996, vol. 9 No. 8, pp. 54–66.

Barbara Hayes–Roth et al, "A Domain–Specific Software Architecture for Adaptive Intelligent Systems," IEEE Transactions on Software Engineering, Apr. 1995, vol. 21, No. 4, pp. 288–301.

Glenn R. Stearns, "Agents and the HP NewWave Application Program Interface," Hewlett–Packard Journal, Aug. 1989, pp. 32–37.

T.J. Grant, "A review of Multi–Agent Systems techniques, with application to Columbus User Support Oganisation," Future Generation Computer Systems, May 1992, vol. 7, No. 4, pp. 413–437.

Mufit Ozden, "Intelligent Objects in Simulation," ORSA Journal on Computing, Fall 1994, vol. 6, No. 4, pp. 329–341.

Peter Gibbons et al, "Intelligent Agents in Multi–Media Systems," Sharp Technical Journal, Dec. 1994, vol. 60, pp. 11–14.

Cristiano Castelfranchi, "Guarantees for Autonomy in Cognitive Agent Architecture," Proceedings of ECAI–94 Workshop on Agent Theories, Architectures, and Languages, Amsterdam, The Netherlands, Aug. 8–9, 1994, pp. 56–70.

Devindra Weerasooriya et al, "Design of a Concurrent Agent–Oriented Language," Proceedings of ECAI–94 Workshop on Agent Theories, Architectures, and Languages, Amsterdam, The Netherlands, Aug. 8–9, 1994, pp. 386–401.

Agostino Poggi, "DAISY: an Object–Oriented System for Distributed Artificial Intelligence," Proceedings of ECAI–94 Workshop on Agent Theories, Architectures, and Languages, Amsterdam, The Netherlands, Aug. 8–9, 1994, pp. 341–354.

David Kinny et al, "Planned Team Activity," 4th European Workshop on Modelling Autonomous Agents in a Multi–Agent World, MAAMAW '92, S. Martino al Cimino, Italy, Jul. 29–31, 1992, pp. 227–256.

Stephen Marsh, "Trust in Distributed Artificial Intelligence," 4th European Workshop on Modelling Autonomous Agents in a Multi–Agent World, MAAMAW '92, S. Martino al Cimino, Italy, Jul. 29–31, 1992, pp. 94–112.

Beerud Sheth et al, "Evolving Agents For Personalized Information Filtering," Proceedings of The Ninth Conference on Artificial Intelligence for Applications, Orlando, Florida, Mar. 1–5, 1993, pp. 345–352.

Tremaine A.O. Cornish et al, "What Has Mill to Say about Data Mining?" Proceedings of The 11th Conference on Artificial Intelligence for Applications, Los Angeles, California, Feb. 20–23, 1995, pp. 347–353.

Siegfried Bocionek, "Software Secretaries: Learning and Negotiating Personal Assistants for the Daily Office Work," Proceedings of IEEE Int'l. Conf. on Systems, Man and Cybernetics, San Antonio, Texas, Oct. 2–5, 1994, vol. 1, pp. 7–12.

Enrique D. Espinosa, "Intelligent Classroom Information Agent Multimedia Lab & Visual Guides for Datastructures II," Proceedings of the Int'l. Conf. on Multimedia Computing and Systems, Washington, D.C., May 15–18, 1995, pp. 302–305.

Rolf Pfeifer et al, "Distributed Adaptive Control: A Paradigm for Designing Autonomous Agents," Toward a Practice of Autonomous Systems, Proceedings of the First European Conf. on Artificial Life, Paris, France, Dec. 1991, pp. 21–30.

Alison Cawsey et al, "A Comparison of Architectures for Autonomous Multi–Agent Communication," Proceedings of 10th European Conference on Artificial Intelligence, Vienna, Austria, Aug. 3–7, 1992, pp. 249–251.

Paul Kearney et al, "Emergent Behaviour in a Multi–Agent Economic Situation," Proceedings of 11th European Conference on Artificial Intelligence, Amsterdam, The Netherlands, Aug. 8–12, 1994, pp. 284–288.

Wayne Wobcke, "Reasoning about Action from the Perspective of Situation Semantics," Proceedings of the 6th Australian Joint Conference on Artificial Intelligence, Melbourne, Australia, Nov. 16–19, 1993, pp. 71–76.

Gunilla A. Sundstrom et al, "Cooperative Human–Computer Decision Making: An Experiment and Some Design Implications," Proceedings of the Human Factors and Ergonomics Society 38th Annual Meeting, Nashville, Tennessee, Oct. 24–28, 1994, pp. 220–224.

T. Moody, "AT&T Personalink (SM)—A Public Network for Smart Agent Pics," IEE Colloquium on Roaming with Data, London, UK, Mar. 6, 1995, Digest No. 1995/046.

Lech Polkowski et al, "Introducing Rough Mereological Controllers: Rough Quality Control," Proceedings of RSSC '94 3rd Int'l. Workshop on Rough Sets and Soft Computing, San Jose, California, Nov. 10–12, 1994.

Terence J. Parr et al, "A Language for Creating and Manipulating VRML," pp. 123–131, Symposium on the VRML '95, San Jose, California, Dec. 14–15, 1995.

Joseph P. Bigus, "Data Mining with Neural Networks", McGraw–Hill Publishing Company, 1996.

David M. Chess, "Security Considerations in Agent–Based Systems," For the 1st Annual Conference on Emerging Technologies and Applications in Communications, Portland, Oregon, May 7–10, 1996.

D. Johansen et al., "Operation System Support for Mobile Agents," Worshop on Hot Topics in Operating Systems, pp. 42–45, 1995.

A. Mensch et al., "REAKT: Real–time Architecture for Time–critial Knowledge–based Systems," Intelligent Systems Engineering, pp. 143–167, Autumn 1994.

A. Reinhardt, "The Network with Smarts,"4465 Byte, McGraw–Hill, Inc., Peterborough, NH US, vol. 19, No. 10, pp. 51–64, Oct. 1994.

H. Nwana et al., "An Introduction to Agent Technology," BT Technology Journal, vol. 14, No. 4, pp. 55–67, Oct. 1996.

A. Rasmusson et al., "Personal Security Assistance for Secure Internet Commerce," New Security Paradigm '96 Workshop, On–Line, pp. 1–12, Sep. 16, 1996.

W. Farmer et al., "Security for Mobile Agents: Issues and Requirements,"Proceedings of the 19th National Information Systems Security Conference, On–Line, pp. 1–7, 1996.

APPARATUS AND METHOD FOR COMMUNICATING BETWEEN AN INTELLIGENT AGENT AND CLIENT COMPUTER PROCESS USING DISGUISED MESSAGES

CROSS-REFERENCE TO RELATED APPLICATIONS

This application is related to the following U.S. Patent Applications, all of which were filed on even date herewith by Bigus et al: U.S. application Ser. No. 08/821,935 entitled "INTELLIGENT AGENT WITH NEGOTIATION CAPABILITY AND METHOD OF NEGOTIATION THEREWITH", U.S. application Ser. No. 08/826,107 entitled "APPARATUS AND METHOD FOR OPTIMIZING THE PERFORMANCE OF COMPUTER TASKS USING MULTIPLE INTELLIGENT AGENTS HAVING VARIED DEGREES OF DOMAIN KNOWLEDGE" and U.S. application Ser. No. 08/822,993 entitled "APPARATUS AND METHOD FOR OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE". The disclosures of all of these applications are hereby incorporated by reference herein.

FIELD OF THE INVENTION

The invention is generally related to intelligent agent computer programs executable on computer systems and the like, and in particular, the decision logic and communications mechanisms used by such programs.

BACKGROUND OF THE INVENTION

Since the advent of the first electronic computers in the 1940's, computers have continued to handle a greater variety of increasingly complex tasks. Advances in semiconductors and other hardware components have evolved to the point that current low-end desktop computers can now handle tasks that once required roomfuls of computers.

Computer programs, which are essentially the sets of instructions that control the operation of a computer to perform tasks, have also grown increasingly complex and powerful. While early computer programs were limited to performing only basic mathematical calculations, current computer programs handle complex tasks such as voice and image recognition, predictive analysis and forecasting, multimedia presentation, and other tasks that are too numerous to mention.

However, one common characteristic of many computer programs is that the programs are typically limited to performing tasks in response to specific commands issued by an operator or user. A user therefore must often know the specific controls, commands, etc. required to perform specific tasks. As computer programs become more complex and feature rich, users are called upon to learn and understand more and more about the programs to take advantage of the improved functionality.

In addition to being more powerful, computers have also become more interconnected through private networks such as local area networks and wide area networks, and through public networks such as the Internet. This enables computers and their users to interact and share information with one another on a global scale. However, the amount of information is increasing at an exponential rate, which makes it increasingly difficult for users to find specific information.

As a result of the dramatic increases in the both complexity of computer programs and the amount of information available to users, substantial interest has developed in the area of intelligent agent computer programs, also referred to as intelligent agents or simply agents, that operate much like software-implemented "assistants" to automate and simplify certain tasks in a way that hides their complexity from the user. With agents, a user may be able to perform tasks without having to know specific sequences of commands. Similarly, a user may be able to obtain information without having to know exactly how or where to search for the information.

Intelligent agents are characterized by the concept of delegation, where a user, or client, entrusts the agents to handle tasks with at least a certain degree of autonomy. Intelligent agents operate with varying degrees of constraints depending upon the amount of autonomy that is delegated to them by the user.

Intelligent agents may also have differing capabilities in terms of intelligence, mobility, agency, and user interface. Intelligence is generally the amount of reasoning and decision making that an agent possesses. This intelligence can be as simple as following a predefined set of rules, or as complex as learning and adapting based upon a user's objectives and the agent's available resources.

Mobility is the ability to be passed through a network and execute on different computer systems. That is, some agents may be designed to stay on one computer system and may never be passed to different machines, while other agents may be mobile in the sense that they are designed to be passed from computer to computer while performing tasks at different stops along the way. User interface defines how an agent interacts with a user, if at all.

Agents have a number of uses in a wide variety of applications, including systems and network management, mobile access and management, information access and management, collaboration, messaging, workflow and administrative management, and adaptive user interfaces. Another important use for agents is in electronic commerce, where an agent may be configured to seek out other parties such as other users, computer systems and agents, conduct negotiations on behalf of their client, and enter into commercial transactions.

Just as human agents have a certain amount of autonomy, intelligent agents similarly have a set of constraints on what they are authorized and not authorized to do. For example, a selling agent for electronic commerce applications may be constrained by a minimum acceptable price. However, a good selling agent, whether electronic or human, would never initially give its lowest acceptable price, as this would minimize profit margins. Furthermore, giving the lowest price may not even assure sales because a buyer may infer that the price is not competitive because the agent is unwilling to lower the price from the original offer. Therefore, an agent typically starts negotiations with some margin from its worst case acceptable price, then works toward a mutually acceptable price with the other party.

Any negotiation plans, techniques, strategies or other confidential information used by an intelligent agent to operate within its constraints, however, often should be hidden from other parties. Otherwise, the agent is placed at a competitive disadvantage. Given that many agents may be dispatched to unsecured environments, an assumption must be made that other parties may be able to scan or reverse engineer an agent to learn its negotiation strategy or other constraints. It must also be assumed that other parties may be able to decode messages sent between an agent and its client to obtain the greatest advantage in negotiation. The validity of such assumptions stems from the fact that these techniques are conceptually similar to many of the techniques used by some salespeople to obtain the best price possible.

For example, if a message to an agent from its client indicates that the agent should offer $100, but is authorized to go as low as $90, another party that intercepts this message immediately knows that a transaction may be completed at the lower price. Also, even if the message is not intercepted, if the agent has stored the $90 price as its lowest authorized offer, reverse compilation or scanning of the agent by another party may lead to similar results.

Efforts have been made to encrypt messages between an agent and its client. However, most conventional encryption methods rely on private "keys" for the agent and the client. Encryption presupposes that both the sender and receiver are in secured environments—only the transmission path between them is unsecured. However, as an agent may be resident on and executing in an unsecured environment, the agent may be reverse compiled or scanned to obtain its private key and thereby break the encryption. Consequently, conventional encryption techniques do not adequately protect the confidential communications of agents or other computer programs executing in unsecured environments.

Therefore, a significant need exists in the art for a manner of protecting the confidential information of an intelligent agent computer program.

SUMMARY OF THE INVENTION

The invention addresses these and other problems associated with the prior art in providing a manner of communication between an agent and its client where a selector is used in the generation and interpretation of messages to effectively disguise confidential information transmitted in the messages from third parties. In contrast to encryption techniques which attempt to scramble the contents of a message, the selector controls how a given message, which need not be scrambled, is interpreted by transmitting and receiving parties.

A selector for use with the various embodiments of the invention may be a predetermined parameter known to both the agent and client, or may be transmitted between the agent and client in the same message as the confidential information or in a separate message. Moreover, the selector may be maintained as a distinct parameter that is known by or transmitted between the parties, or may be derived from an existing parameter having another use or purpose.

The selector may be used in a number of manners to disguise confidential information. For example, the selector may be used to select one of a plurality of messages to transmit, to select one of a plurality of alternate meanings for a particular message, to select where the confidential information is in a plurality of transmitted messages, and to indicate which of a plurality of messages to omit from a transmission, among others.

Moreover, in certain embodiments of the invention, the decision logic of an agent may be disguised from third parties through the use of neural networks to implement part or all of the decision logic. Neural networks, which rely on interconnected nodes having variable weights to encode logic, are not readily reverse compiled or scanned, thus offering significant security advantages for an agent that is operating in an unsecured environment.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described illustrated embodiments of the invention.

DETAILED DESCRIPTION OF THE ILLUSTRATED EMBODIMENTS

The embodiments of the invention incorporate various manners of disguising confidential information in an intelligent agent from third parties.

Intelligent agents are computer programs which have been delegated a degree of autonomy but which are limited to operating within constraints defined by their client (which may be, for example, another agent; a computer program, application or system; or an individual interacting with the agent through a computer—hereinafter a client computer process). A subset of such agents which are capable of being passed between and operating in different applications or computer systems are referred to as mobile agents.

In general, an agent has the ability to sense, recognize and act. These functions are typically embodied in a number of components, including an engine, a knowledge component, an adapters component, a library, and a view component. Generally, the engine controls the overall operation of an agent and functions as the "brains" of the agent, and the knowledge component stores information that is representative of the acquired knowledge of the agent. The adapters component handles interaction between an agent and external objects, thereby functioning as the mechanism through which the agent "senses" and interacts with its environment. A library persistently stores the information utilized by the knowledge component, and the view component provides the human interface, if any, for an agent, e.g., for supplying instructions to the agent.

An agent may receive, transmit, store and otherwise utilize confidential information such as data, unique decision logic or strategies, desired goals, etc. to which a client may wish to limit access by third parties. For example, in electronic commerce applications, an agent may wish to prevent parties with which it is negotiating from knowing certain information such as its negotiation strategy and authorized offer limits. This confidential information may be subject to scrutiny, however, if another party is capable of intercepting messages between the agent and its client, or if another party is capable of reverse compiling or otherwise scanning the program code of the agent.

To address the former problem, the embodiments of the invention utilize a unique signaling methodology which relies on a selector that is ultimately known by both the agent and agent manager to generate and interpret messages which disguise the confidential information contained therein. As will become apparent below, in contrast to encryption techniques, the messages need not be modified, encrypted or scrambled, as the selector is used primarily to interpret the meaning of the messages.

One difference between the use of a selector and encryption techniques is that, in the case of a selector, a third party may mistakenly believe a message has a different meaning than its true meaning and may inadvertently act to the advantage of the client. Another advantage over encryption is that the fact that a message is disguised is not readily apparent, whereby the message typically does not stand out relative to other messages. It should be appreciated, however, that encryption techniques may be used in combination with message disguising in certain embodiments of the invention, with encryption used on disguised or undisguised messages. In one embodiment, for example, the information to be transmitted may be sent in disguised messages with encrypted decoy messages also sent to draw attention away from the disguised messages.

Figure 1:
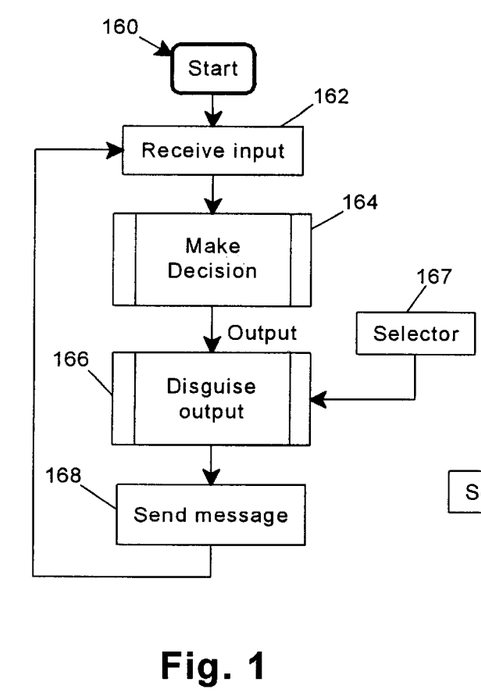
FIG. 1 is a flowchart illustrating the operation of an intelligent agent consistent with the principles of the invention, utilizing procedural decision making and message disguising.

For example, FIG. 1 illustrates a program flow for an intelligent agent 160 consistent with the invention. Agent 160 operates by receiving input at block 162 and making a decision based upon the input at block 164. Block 164 outputs confidential information therefrom, which is disguised in a message in block 166 based upon a selector 167. The message is then sent in block 168 and control returns to block 162.

The use of a selector may be analogized to the hand signals used by baseball players and coaches to communicate during a baseball game (e.g., pulling on the ear, touching the nose, etc.). The signals or messages are visible to all, yet are difficult, if not impossible, to interpret because they are known only to the team using them, and because their meanings are often changed. Certain signals may have different meanings in different situations, which may confuse the other team or cause the other team to mistakenly believe a particular signal has another meaning.

The selector may be used in a number of manners to disguise confidential information. For example, a selector may be used to select one of a plurality of messages to transmit to convey a particular piece of confidential information. Moreover, one or more of the messages may have a plurality of alternate meanings. This may permit one set of messages to represent a plurality of pieces of confidential information, although it should be appreciated that messages need not have more than one meaning.

For example, Table I below shows a transform table illustrating how three messages "A", "B" and "C" from a message set may be used by an agent to convey three pieces of confidential information (here, whether to accept or counteroffer) depending upon the value of a selector:

TABLE I

Example Transform Table

| Information to Convey | Selector | | |
|---|---|---|---|
| | 1 | 2 | 3 |
| will go lower, no risk | Msg A | Msg B | Msg C |
| may go lower, some risk | Msg B | Msg C | Msg A |
| doubtful will go lower, high risk | Msg C | Msg A | Msg B |

One advantage of this configuration is that the messages, beyond disguising their contents or intended meaning, may cause another party to mistakenly believe a particular message has a different meaning. For example, if a buying agent sends a message to the client seeking authorization to complete a transaction at the last offered price, but the message is interpreted by the selling party to mean that the agent wants to terminate negotiations, the selling party may reduce its price to try to complete the transaction.

A selector may also be used to select which of a plurality of messages contains the desired confidential information. For example, messages A, B and C from Table I above could all be transmitted together, within a single transmission, with the selector indicating which of the messages should be considered. Similarly, a selector may be used to select which of a plurality of messages to omit from a transmission. For example, for a set of messages A–C, transmit messages A and B but not C to convey a certain piece of information.

A selector may be a predetermined parameter known to both the agent and client. For example, the selector may be modified after a predetermined number of communications or cycles (e.g., every three transmissions).

A selector may also be transmitted between the agent and client in the same message as the confidential information, in a separate message within the same transmission, or in a separate transmission altogether. For example, an agent manager may transmit an "increment selector" message to the agent so that the next selector value in a set of possible values is used, or an agent may precede a message with a separate message indicating from which message set the manager should interpret the message (e.g., for Table I, message D indicates selector 1, message E indicates selector 2, message F indicates selector 3).

Multiple selectors may be interleaved with the confidential information in a message, e.g., sets of bits. For example, a 32 bit message could contain 3 8-bit pieces of data, along with 8-bits of selector information parsed into 4 2-bit selectors that are disposed at the boundaries of the 8-bit pieces of data. A look-up table may be utilized to assist in the interleaving of selector information into a message. In addition, other extraneous information that is ignored during interpretation may be included in a message, e.g., a few high order bits may be added to a value, but may be ignored during interpretation. Furthermore, information may be split between multiple messages or transmissions, with a selector controlling from where the information may be retrieved and how it is to be interpreted.

Moreover, the selector may be maintained as a distinct parameter that is known by or transmitted between the parties, or may be derived from an existing parameter having another use or purpose. For example, a selector may be derived from the time stamp on a message (e.g., the last digit, or the remainder when the sum of the digits is divided by three, etc.), or from a checksum value for the message. Other seemingly innocuous information, whether known to both the client and agent, or transmitted therebetween, may be used to generate a "pseudo-random" selector.

Figure 2:
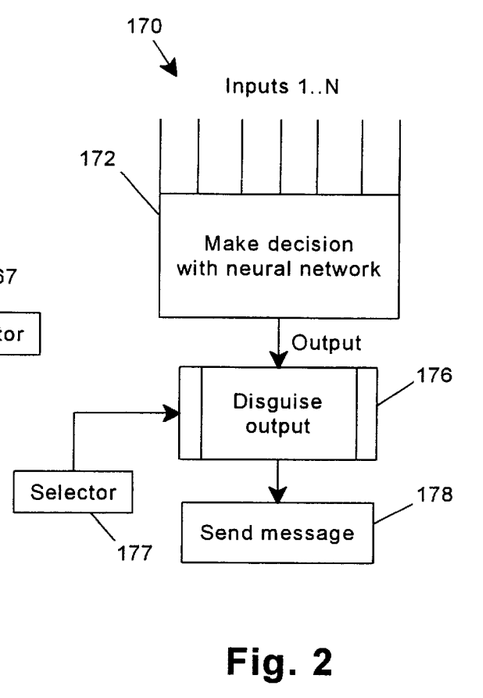
FIG. 2 is a flowchart illustrating the operation of another intelligent agent consistent with the principles of the invention, utilizing neural network-implemented decision making and procedural message disguising.

Agent 160 of FIG. 1 illustrates a procedural process of decision making and message disguising, whereby a series of steps are executed sequentially by a computer program to handle the functions in blocks 164 and 166. However, procedural logic may be subject to reverse compilation and scanning by third parties. One alternative to agent 160 is illustrated in FIG. 2, where an agent 170 substitutes a neural network 172 for procedural decision making. Message disguising is still handled through a procedural block 176 which receives a selector 177 and outputs a disguised message sent via block 178.

The implementation and training of neural networks is well known in the art. The primary advantage of neural network-implemented decision making is that it is extremely difficult to determine the logic trained into a neural network since the logic is based upon weights, and not on a procedural process. A neural network utilizes a set of processing elements or nodes that are interconnected in a network, with each node typically outputting a weighted sum of its inputs. The weight to apply to each input to a node is "learned" over time by a neural network by training the network with sample, or training, data.

However, while agent 170 is significantly more resistant to scrutiny by third parties, the agent may still be subject to some scrutiny since a procedural process is used in block 176 to generate disguised messages from an undisguised output generated by the neural network. It must be assumed that any undisguised data stored in an agent may be subject to reverse compilation and scanning when the agent is in an unsecured environment.

Figure 3:
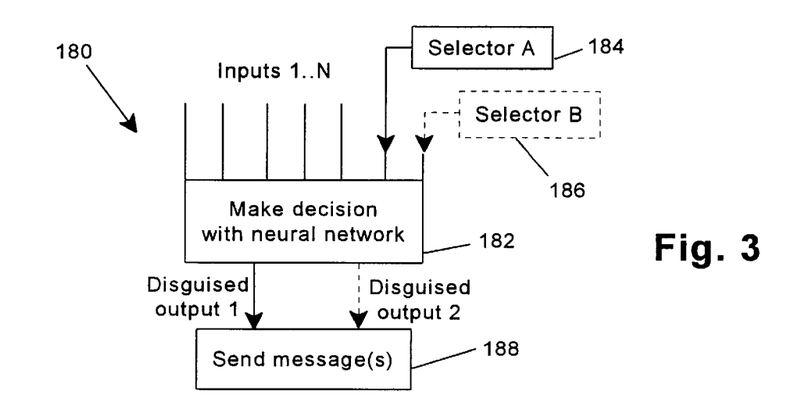
FIG. 3 is a flowchart illustrating the operation of another intelligent agent consistent with the principles of the invention, utilizing neural network-implemented decision making and message disguising.

FIG. 3 illustrates an agent 180 which extends the use of a neural network to both decision making and message disguising. A neural network 182 receives a plurality of inputs, including also one or more selectors (e.g., selectors 184 and 186) from which a disguised message is generated. Also, neural network 182 only outputs one or more disguised outputs (e.g., disguised output 1 and disguised output 2). Consequently, at no point is any undisguised data stored in agent 180.

Training of neural network 182 requires additional training records or examples to handle message disguising in view of the additional input of a selector to the network. For example, to train a neural network without disguised messages, the standard training data would include N training records, as shown in Table II below:

TABLE II

Standard Training Records

| Inputs | | | | Outputs |
|---|---|---|---|---|
| i1.1 | i1.2 | i1.3 | ... | o1 |
| i2.1 | i2.2 | i2.3 | ... | o2 |
| . | . | . | . | . |
| . | . | . | . | . |
| . | . | . | . | . |
| iN.1 | iN.2 | iN.3 | ... | oN |

However, to also train the neural network to disguise messages, additional training records are required given that an output may be represented by more than one message. In general one group of training records are required for each possible value of the selector, which may be accomplished merely by reusing the original pure training information, duplicated for each value of the selector (e.g. 1 - K), and with the messages (e.g., messages A, B, . . . M) properly arranged for each value, as shown in Table III below:

TABLE III

Example Training Records - One Selector

| Inputs | | | | Selector | Outputs |
|---|---|---|---|---|---|
| i1.1 | i1.2 | i1.3 | ... | 1 | msg 1.A |
| i2.1 | i2.2 | i2.3 | ... | 1 | msg 1.B |
| . | . | . | . | . | . |
| . | . | . | . | . | . |
| . | . | . | . | . | . |
| iN.1 | iN.2 | iN.3 | ... | 1 | msg 1.M |
| i1.1 | i1.2 | i1.3 | ... | 2 | msg 2.A |
| i2.1 | i2.2 | i2.3 | ... | 2 | msg 2.B |
| . | . | . | . | . | . |
| . | . | . | . | . | . |
| . | . | . | . | . | . |
| iN.1 | iN.2 | iN.3 | ... | 2 | msg 2.M |
| i1.1 | i1.2 | i1.3 | ... | 3 | msg 3.A |
| i2.1 | i2.2 | i2.3 | ... | 3 | msg 3.B |
| . | . | . | . | . | . |
| . | . | . | . | . | . |
| . | . | . | . | . | . |
| iN.1 | iN.2 | iN.3 | ... | 3 | msg 3.M |
| . | . | . | . | . | . |
| . | . | . | . | . | . |
| i1.1 | i1.2 | i1.3 | ... | K | msg K.A |
| i2.1 | i2.2 | i2.3 | ... | K | msg K.B |
| . | . | . | . | . | . |
| . | . | . | . | . | . |
| . | . | . | . | . | . |
| iN.1 | iN.2 | iN.3 | ... | K | msg K.M |

To output more than one disguised message at a time requires no additional training besides that required by the number of inputs. For example, as shown in Table IV, to generate three output messages, the following training data may be used:

TABLE IV

Example Training Records - Multiple Messages

| Inputs | | | | Selector | Outputs | | |
|---|---|---|---|---|---|---|---|
| i1.1 | i1.2 | i1.3 | ... | 1 | msg 1.A1 | msg 1.A2 | msg 1.A3 |
| i2.1 | i2.2 | i2.3 | ... | 1 | msg 1.B1 | msg 1.B2 | msg 1.B3 |
| . | . | . | . | . | . | . | . |
| . | . | . | . | . | . | . | . |
| . | . | . | . | . | . | . | . |
| iN.1 | iN.2 | iN.3 | ... | 1 | msg 1.M1 | msg 1.M2 | msg 1.M3 |
| i1.1 | i1.2 | i1.3 | ... | 2 | msg 2.A1 | msg 2.A2 | msg 2.A3 |
| i2.1 | i2.2 | I2.3 | ... | 2 | msg 2.B1 | msg 2.B2 | msg 2.B3 |
| . | . | . | . | . | . | . | . |
| . | . | . | . | . | . | . | . |
| iN.1 | iN.2 | iN.3 | ... | 2 | msg 2.M1 | msg 2.M2 | msg 2.M3 |
| i1.1 | i1.2 | i1.3 | ... | 3 | msg 3.A1 | msg 3.A2 | msg 3.A3 |
| i2.1 | i2.2 | i2.3 | ... | 3 | msg 3.B1 | msg 3.B2 | msg 3.B3 |
| . | . | . | . | . | . | . | . |
| . | . | . | . | . | . | . | . |
| iN.1 | iN.2 | iN.3 | ... | 3 | msg 3.M1 | msg 3.M2 | msg 3.M3 |
| . | . | . | . | . | . | . | . |
| . | . | . | . | . | . | . | . |
| i1.1 | i1.2 | i1.3 | ... | K | msg K.A1 | msg K.A2 | msg K.A3 |
| i2.1 | i2.2 | i2.3 | ... | K | msg K.B1 | msg K.B2 | msg K.B3 |
| . | . | . | . | . | . | . | . |
| . | . | . | . | . | . | . | . |
| iN.1 | iN.2 | iN.3 | ... | K | msg K.M1 | msg K.M2 | msg K.M3 |

In addition, to generate disguised messages based upon more than one selector, a set of training data is required for each combination of selector values. For example, as shown in Table V, for a set of three selectors, and two outputs, the following training data may be used:

TABLE V

Example Training Records - Multiple Selectors

| Inputs | | | | Selector | Outputs |
|---|---|---|---|---|---|
| i1.1 | i1.2 | i1.3 | ... | 1.1.1 | msg 1.1.1.A1 msg 1.1.1.A2 |
| i2.1 | i2.2 | i2.3 | ... | 1.1.1 | msg 1.1.1.B1 msg 1.1.1.B2 |
| . | . | . | . | . | |
| . | . | . | . | . | |
| . | . | . | . | . | |
| iN.1 | iN.2 | iN.3 | ... | 1.1.1 | msg 1.1.1.M1 msg 1.1.1.M2 |
| i1.1 | i1.2 | i1.3 | ... | 1.1.2 | msg 1.1.2.A1 msg 1.1.2.A2 |
| i2.1 | i2.2 | i2.3 | ... | 1.1.2 | msg 1.1.2.B1 msg 1.1.2.B2 |
| . | . | . | . | . | |
| . | . | . | . | . | |
| . | . | . | . | . | |
| iN.1 | iN.2 | iN.3 | ... | 1.1.2 | msg 1.1.2.M1 msg 1.1.2.M2 |
| i1.1 | i1.2 | i1.3 | ... | X.Y.1 | msg X.Y.1.A1 msg X.Y.1.A2 |
| i2.1 | i2.2 | i2.3 | ... | X.Y.1 | msg X.Y.1.B1 msg X.Y.1.B2 |
| . | . | . | . | . | |
| . | . | . | . | . | |
| . | . | . | . | . | |
| iN.1 | iN.2 | iN.3 | ... | X.Y.1 | msg X.Y.1.M1 msg X.Y.1.M2 |
| . | . | . | . | . | |
| . | . | . | . | . | |
| . | . | . | . | . | |
| i1.1 | i1.2 | i1.3 | ... | X.Y.Z | msg X.Y.Z.A1 msg X.Y.Z.A2 |
| i2.1 | i2.2 | i2.3 | ... | X.Y.Z | msg X.Y.Z.B1 msg X.Y.Z.B2 |
| . | . | . | . | . | |
| . | . | . | . | . | |
| . | . | . | . | . | |
| iN.1 | iN.2 | iN.3 | ... | X.Y.Z | msg X.Y.Z.M1 msg X.Y.Z.M2 |

It should be appreciated that the training records used to train a neural network depend upon the particular logic desired to be encoded in the network. Moreover, it should be appreciated that the message disguising function of an agent may be implemented either via a neural network or with procedural decision making, and that separate neural networks may be used for the decision making and message disguising functions. In addition, various additional functions for an agent may be incorporated into the same or different neural networks as for either the decision making or message disguising functions. Other modifications will be apparent to one skilled in the art.

Exemplary Hardware/Software Environment

Figure 4:
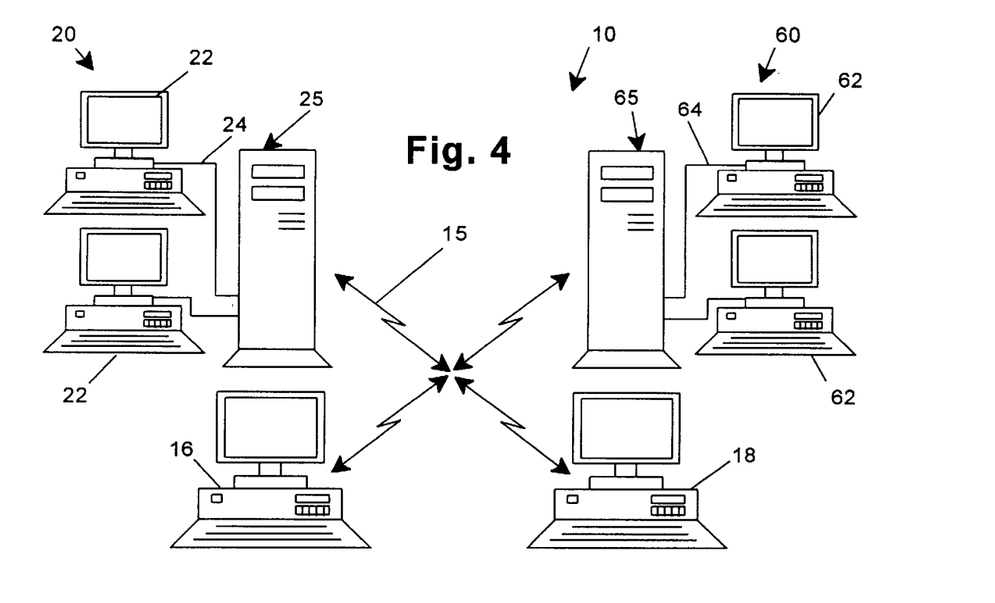
FIG. 4 is a block diagram of a networked computer system environment for use with the illustrated embodiments of the invention.

A representative hardware environment suitable for the training and/or hosting of intelligent agents consistent with the invention is illustrated in FIG. 4, where a networked computer system 10 generally includes one or more computer systems, e.g., single-user computer systems 16, 18 and multi-user computer systems 20, 60, coupled through a network 15. Multi-user computer system 20 typically includes one or more servers 25 to which one or more single-user computers 22 may networked through a separate network 24. Similarly, multi-user computer system 20 typically includes one or more servers 65 coupled to one or more single-user computer systems 62 through a network 64. Network 15 may represent any type of networked interconnection, including but not limited to local-area, wide-area, wireless, and public networks (e.g., the Internet).

Figure 5:
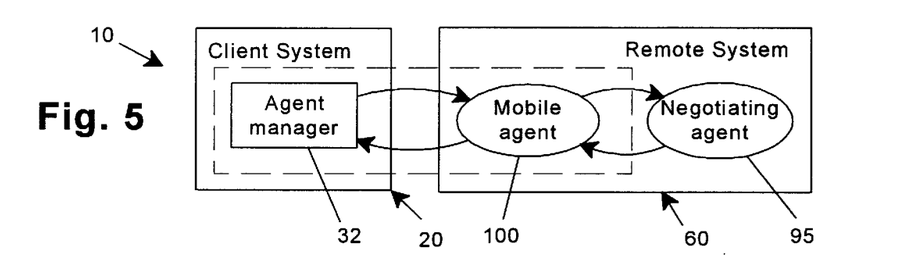
FIG. 5 is a block diagram of the networked computer system of FIG. 4, illustrating the interaction between intelligent agents therein.

It is anticipated that agents consistent with the invention may originate in and be resident from time to time on any of the above-mentioned computer systems. One possible distinction between the computer systems for the purposes of the invention may be whether each is a client or a remote system relative to a particular agent. For example, FIG. 5 illustrates an embodiment of computer system 10 where multi-user computer system 20 is a client system, and multi-user computer system 60 is a remote system.

A client system will hereinafter refer to a computer system that provides an agent a certain level of security from manipulation by other parties when the agent is resident on the system. The client system is also the computer system from which management of the agent is typically handled. The agent typically but not necessarily will also originate from the client system.

A remote system, on the other hand, will hereinafter refer to a computer system that is typically not capable of providing a desired level of security for an agent, generally because the computer system is not under the control of the client. It is typically while resident on a remote system that an agent runs the greatest risk of being scanned or reverse compiled, or of having communications intercepted or monitored, by other parties.

The various embodiments described herein have principal uses in electronic commerce applications, where agents are configured to negotiate commercial transactions, generally in the role of buying or selling agents. The agents may negotiate with other agents, other computer systems, or even other individuals. The agents may interact one-on-one, or may be capable of operating within a "market" of multiple agents, along the lines of a stock or commodity market. Computer systems having the ability to host agents for interaction therebetween include negotiating programs of varying sophistication and are hereinafter referred to as agent hosts. However, it should be appreciated that the invention applies equally to other applications of intelligent agents, and thus should not be limited specifically to commercial applications.

FIG. 5 illustrates a mobile intelligent agent 100 which communicates with an agent manager 32 in client system 20. During negotiation with another party such as negotiating agent 95, mobile agent 100 is resident on remote system 60. It should be appreciated that remote system 60 may be the client for agent 95, or may also be considered to be remote relative to this agent as well.

Figure 6:
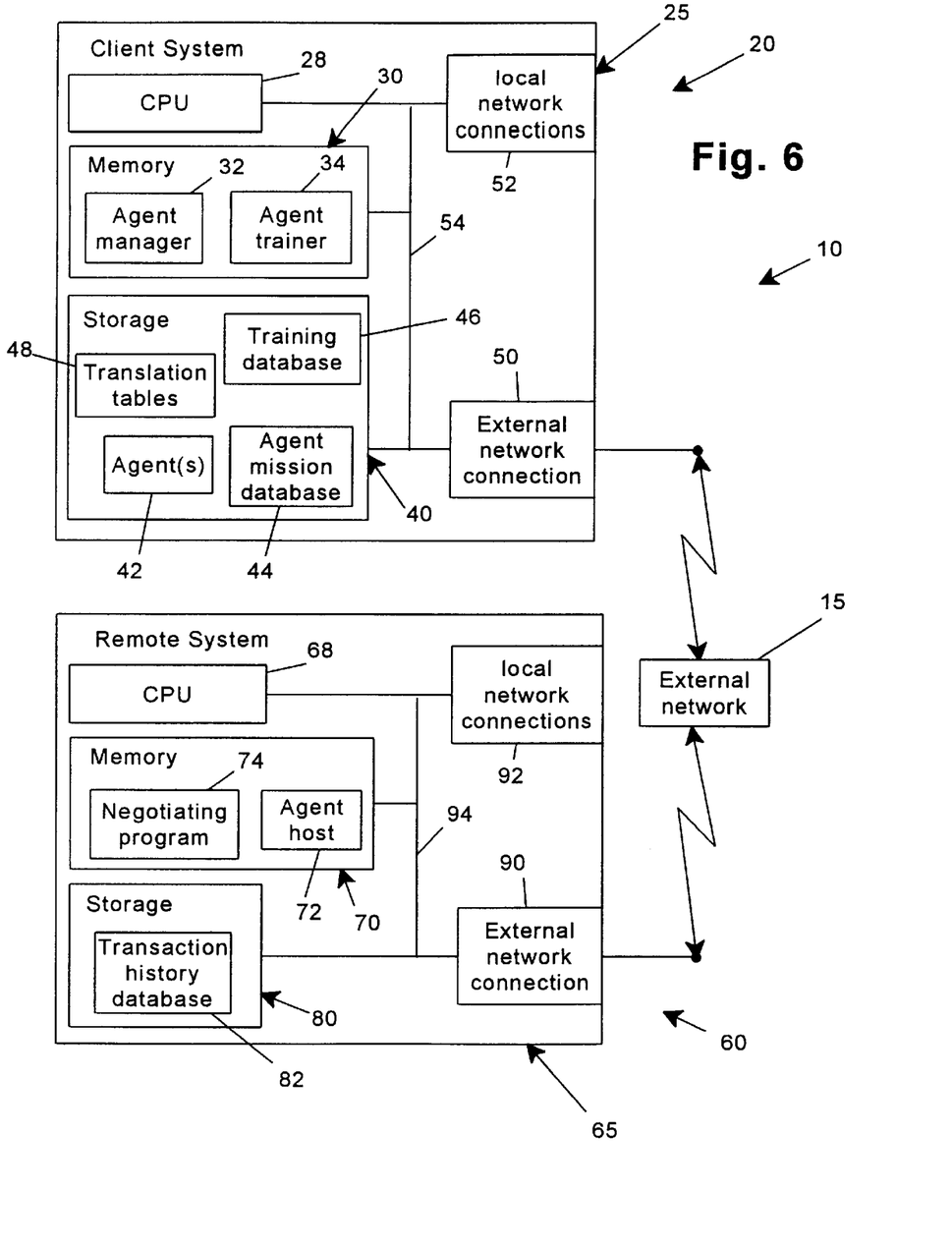
FIG. 6 is another block diagram of the networked computer system of FIG. 4, illustrating in greater detail the primary components in the client and remote computer systems.

An exemplary functional design of networked computer system 10 for implementing the various embodiments of the invention is illustrated in FIG. 6. Server 25 of client system 20 generally includes a central processing unit (CPU) 28 coupled to a memory 30 and storage 40 over a bus 54. A local area network interface is provided at 52, and an interface to remote system 60 over external network 15 is provided through interface 50. Agent manager program 32 is resident in memory 30, as is an agent trainer program 34 which trains agents. Storage 40 includes one or more trained agents 42 (of which may include agent 100, for example), which are computer programs or modules that may be retrieved and used locally within system 20, or dispatched to remote systems to execute and perform tasks on behalf of the client system. Storage 40 also includes an agent mission database 44 which may track agent operations and the relative success or failure thereof. Moreover, a training database 46 includes training data utilized by agent trainer program 34 to train agents, and translation tables 48 are utilized by agent trainer program 34 as well as by agent manager 32 to encode and decode messages to and from mobile agents, as will be discussed in greater detail below.

Server 65 of remote system 60 also includes a CPU 68 coupled to a memory 70, storage 80, external network connection 90 and local network connection 92 over a bus 94. An agent host program 72 is resident in memory 70 to handle interactions between agents resident in the remote system. Typically, the agent host program is an asynchronous message/event driven environment that provides a common platform over which agent computer programs execute and interact, much like an operating system. The agent host is also capable of permitting messages to be sent between agents and their clients. Memory 70 also includes a negotiating program 74 which operates as the "other party" in transactions with agent 100, which may be another agent, a market or bulletin board application, or even an interface program through which an individual interacts with agent 100. Storage 80 maintains a transaction history database 82 which logs the transactions completed on the server.

Servers 25, 65 may be, for example, AS/400 midrange computers from International Business Machines Corporation. However, it should be appreciated that the hardware embodiments described herein are merely exemplary, and that a multitude of other hardware platforms and configurations may be used in the alternative.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as floppy disks, hard disk drives, and CD-ROM's, and transmission type media such as digital and analog communications links.

Decision Making and Message Disguising with Intelligent Agents

Figure 7:
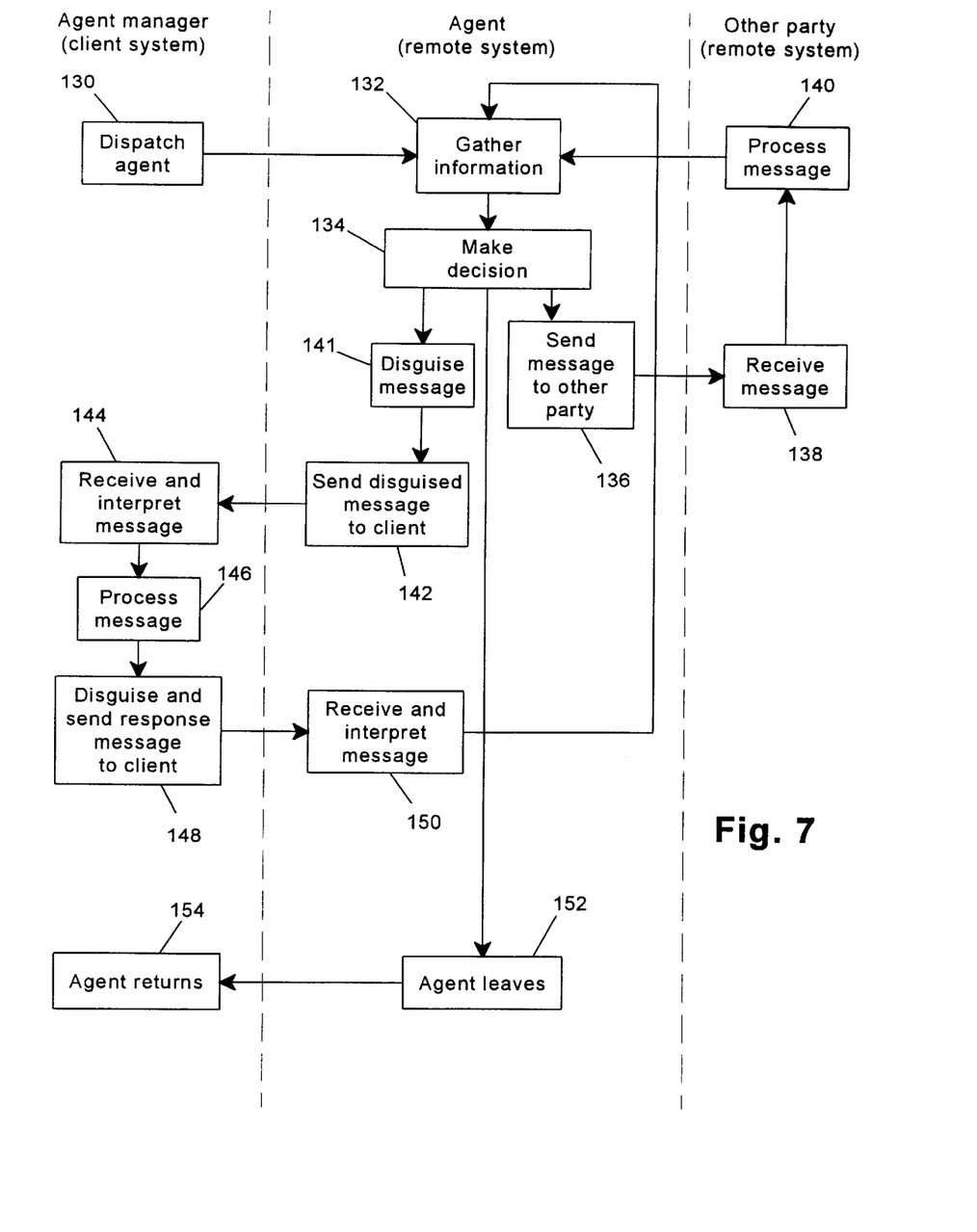
FIG. 7 is a flowchart illustrating the interaction between the agent manager, mobile agent and negotiating agent (other party) of FIG. 5.

FIG. 7 illustrates an exemplary program flow illustrating the interaction between an agent 100, agent manager 32 and another party, negotiating agent 95. Negotiations are generally instituted by agent manager 32 by dispatching agent 100 to a remote system, as illustrated in block 130. It should be appreciated that agent 100 may be dispatched with a desired transaction or transactions which the client wishes to complete (including information such as desired quantity, description of goods/services to be sold/purchased, etc.), as well as any other constraints placed upon the agent by the manager (e.g., the number of negotiation iterations to process, a maximum or minimum limit on the amount to offer, etc.). In the alternative, some or all of this information may be relayed to agent 100 at a later time by agent manager 32.

Next, in block 132, agent 100 gathers and filters information after it has been dispatched to the remote system. For example, agent 100 may poll a bulletin board or market for outstanding offers, or may attempt to find and initiate negotiations with another party, e.g., another computer system, another agent, or an individual interacting through a computer system. Agent 100 may also simply wait for incoming offers from other parties. Block 132 also performs the functions of processing messages from other parties and from the agent manager.

Next, in response to input received by agent 100, a decision is made by agent 100 in block 134. It is in this block that the negotiation strategy of agent 100 is implemented, whereby the agent determines, based upon the input it receives, whether and how to proceed in negotiations with another party. Also, supportive procedural processing is completed, such as incrementing internal counts, e.g., the number of iterations (discussed below).

Generally, one of three actions may be instituted in response to block 134. First, as illustrated by block 136, agent 100 may decide to send a message to other party 95, e.g., indicating acceptance or rejection of an outstanding offer, issuing an offer or counteroffer, terminating negotiations, requesting that the other party wait, etc. The other party receives the message at block 138 and processes it at block 140, typically issuing a response message back to agent 100. Control of agent 100 returns to block 132 to process the response message from party 95.

Second, as illustrated by blocks 141 and 142, agent 100 may decide to send a message back to agent manager 32. Consistent with the invention, this message is disguised in block 141 in the manner disclosed herein, and then sent in block 142. Agent manager 32 then receives and interprets the message at block 144, processes the message in block 146 and disguises and sends a response message back to agent 100 in block 148. Upon receipt of the response message, block 150 interprets the message and passes control to block 132 to process the response message from agent manager 32.

Third, as illustrated by block 152, agent 100 may decide to leave the remote system and return to its client system, e.g., after completion of a successful transaction or after termination of an unsuccessful negotiation. The return of the agent is illustrated in block 154.

The illustrated program flow for agent 100 is an example of a semi-autonomous agent that has authority to negotiate with another party with limits on the offer amount and the number of iterations (offers made by the agent) that the agent can undertake on its own. Agents with greater or lesser degrees of domain knowledge may also be used consistent with the invention. For example, a fully autonomous agent may be delegated the authority to negotiate without any input other than a desired transaction. In contrast, a fully dependent agent may have little authority other than to act as an intermediary by issuing offers and completing transactions pursuant to specific instructions from a manager and reporting the results back to the manager.

Various agents of this type are discussed further, for example, in U.S. Patent application Ser. Nos. 08/822,993 and 08/826,107, respectively entitled "APPARATUS AND METHOD FOR OPTIMIZING THE PERFORMANCE OF COMPUTER TASKS USING MULTIPLE INTELLIGENT AGENTS HAVING VARIED DEGREES OF DOMAIN KNOWLEDGE" and "APPARATUS AND METHOD FOR OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE", which have been incorporated by reference. As is also discussed in these applications, agent 100 may be one of several agents having varying degrees of domain knowledge, or may have multiple modules with varying degrees of domain knowledge, so that the agent may be optimized for operation in different situations based upon an objective criteria (e.g., security concerns).

Figure 8A:
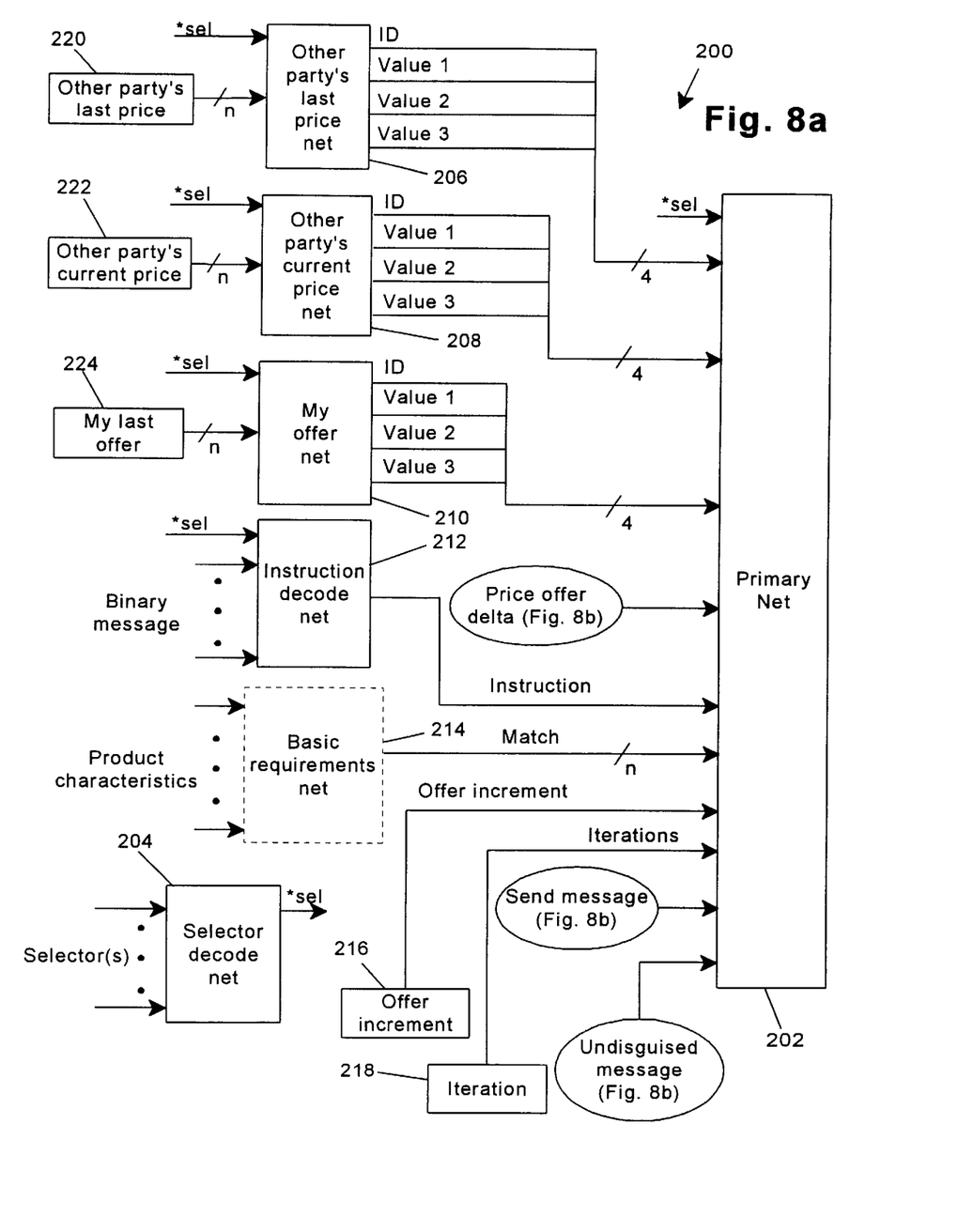
FIGS. 8a and 8b are block diagrams illustrating the primary components in one embodiment of the intelligent agent of FIG. 5.
Figure 8B:
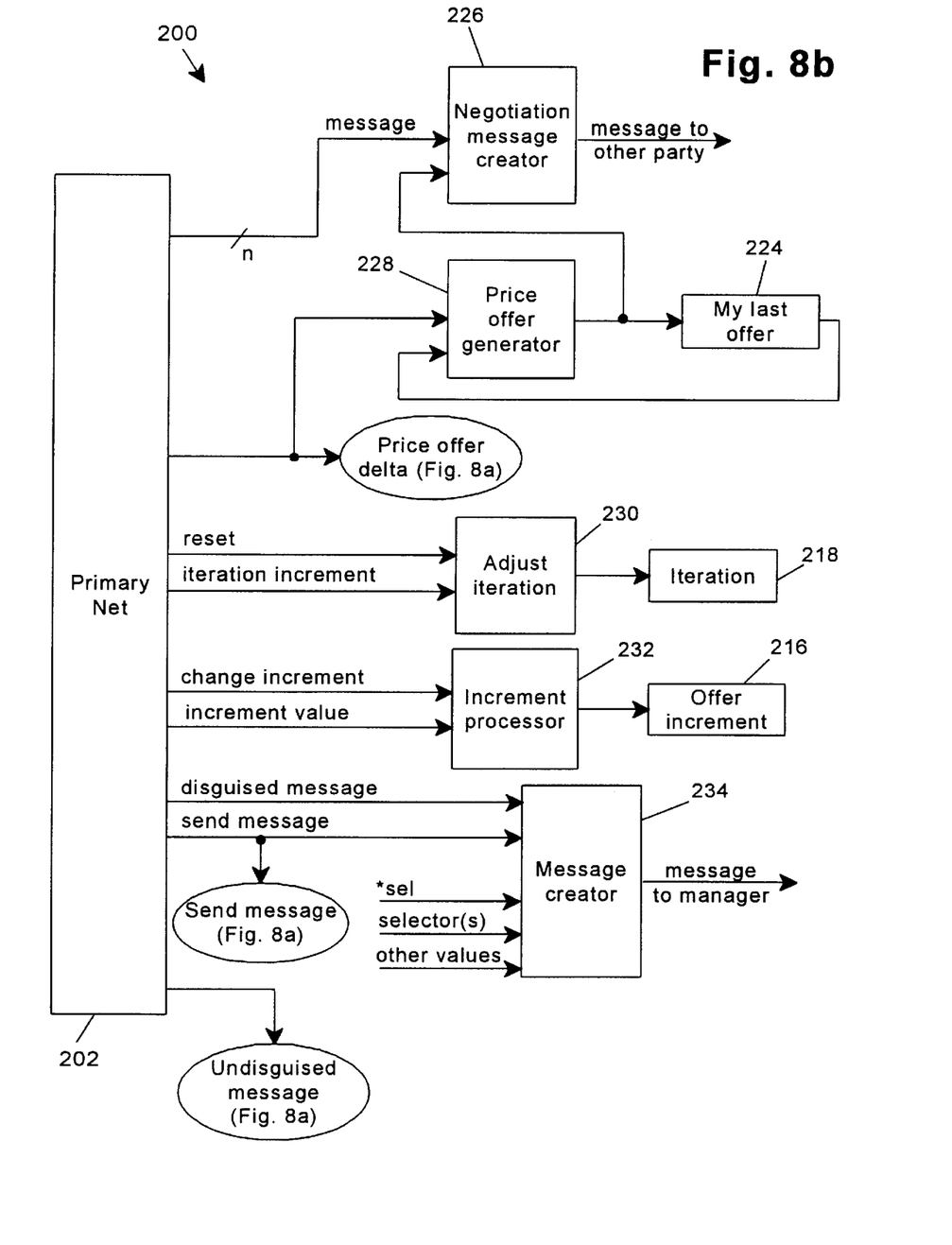

The primary components in agent 100 for implementing the program flow of FIG. 7 are illustrated by negotiation module or mechanism 200 in FIGS. 8a and 8b. A mechanism or module may be considered to include any function, object, or block of program code configured to perform a desired task or operation.

Module 200 is configured to utilize a selector such as a message time stamp or other transmitted parameter, with a single set of messages used to disguise various confidential instructions and requests passed between the client and the agent. The client and agent in this embodiment transmit only one message at a time to represent a given instruction or request, and some if not all of the messages have alternate meanings depending upon the value of the selector. However, it should be appreciated that any of the above-described modifications and variations in terms of possible selectors and manners of disguising messages may be used in the alternative.

Module 200 is configured to receive the following inputs:
other party's last price
other party's current price
agent's last public offer
product characteristics
instruction from manager:
increase in offer authorized
increase in iterations authorized
increase in offer not authorized
increase in iterations not authorized
last message sent back to manager
selector(s)

In addition, module 200 is configured to generate the following outputs:
public price offer
message to other party
make offer
withdraw
accept
reject
counteroffer
please wait
finished
message to manager
probable acceptable alternative, do you accept
iterations exceeded, recommend continue
iterations exceeded, recommend withdrawal
recommend immediate withdrawal
dummy transmission to motivate negotiation
request approval to increase offer Two variables, the number of iterations and the offer increment (the current authorized negotiation margin for the agent), are also maintained in module 200 for feedback purposes, but are generally not accessed by external sources.

Moreover, for training purposes, additional information may also be used in the generation of suitable training records, although the information is not directly input to the module. Such information includes:
desired price and features
agent autonomy price range (range of prices within which agent is authorized to negotiate autonomously)
manager approval price range (range of prices within which agent requires approval from manager)
acceptable iterations allowed without approval Module 200 includes a primary neural network 202 in which the decision logic for decision making (including negotiation strategy), message disguising, and other functions is implemented. In addition, as shown in FIG. 8a, a number of filters 204–214 are utilized at the input side of primary network 202 to condition the inputs to the network, since neural networks typically operate on weights in the range of −1 to +1, or 0 to +1. Filters 204–214 may be implemented using procedural logic, or alternatively, may be implemented using separate neural networks to increase security.

A selector decode filter 204 is implemented in this embodiment as a neural network which receives the desired selector information and outputs a decoded selector signal, designated sel. The decoded selector signal is provided to primary network 202, as well as to a number of the filters in module 200, as detailed below. The configuration of filter 204 will vary depending upon the type of information used as a selector. For example, if a time stamp or other transmitted parameter is used, such information would be input to filter 204. On the other hand, if a non-transmitted parameter is used, e.g., if the selector is changed every n transmissions, then filter 204 may be configured as a logic element such as a counter which is incremented every n transmission cycles. Because it may be possible for selector values to be observed as they are being gathered, any amount of superfluous information may also be gathered to assist in deception.

The last and current prices offered by the other party to the negotiation are stored in a pair of registers 220, 222 and conditioned by filters 206 and 208, which in this embodiment are implemented using neural networks. In addition, the last offer generated by the agent is stored in a register 224 and conditioned by filter 210, also implemented as a neural network. Filters 206–208 also receive the decoded selector input. Registers 220 and 222 are maintained by the information gathering block 132 (FIG. 7) based upon the prices received from the other party. Register 224 is maintained by a price offer generator filter 228 (FIG. 8b, as discussed below).

In addition, each filter 206–210 outputs an identification (ID) signal, as well as three data signals designated value 1, value 2 and value 3. The ID signal output by each filter operates similar to a selector to indicate which of the n (here three) data signals includes the conditioned representation of the corresponding register's contents. The other two data signals operate are unused and act as decoys to deter reverse compilation of the decision logic of the module. The ID signal may be a function of the decoded selector input, or may be independent thereof. In the alternative, a single value signal may be connected between each filter 206–210 and primary network 202 if detection of these conditioned signals is not a concern.

An instruction decode network filter 212 receives binary messages from the client, as well as the decoded selector signal to interpret the messages. A single instruction signal is output from filter 212. The instruction signal varies for any given message depending upon the value of the decoded selector signal.

An optional basic requirements network filter 214, which is primarily useful for a buying agent, receives one or more product characteristics related to the features of the goods/services being negotiated for compared to the features desired by the client. In response, filter 214 outputs a match signal which indicates the degree in which the products being negotiated for match what the client is actually looking for.

The product characteristics may include basic requirements that must be met to complete the transaction, as well as additional features that may not be required but which may make the products more desirable to the client. For example, for a VCR, a client may require that it have four heads, but the client may be willing to pay more for a hi-fi stereo model if one is available. The match signal for a hi-fi model being negotiated for may be weighted more strongly than one without hi-fi, and as a consequence, the agent may be configured to negotiate more strongly for the hi-fi model in response to this signal.

Two additional registers 216, 218 are maintained by primary network 202 and are fed back as input thereto. An offer increment register 216 represents the current negotiation margin for the agent, as modified by the agent manager through instructions to the agent. The negotiation margin represents in filtered form that amount over which (for a buying agent) or under which (for a selling agent) the agent may complete a transaction outside of the desired price for the transaction.

An iteration register 218 maintains in filtered form the number of cycles in the current negotiation, where one cycle typically represents a transmission from the agent to another party or to the agent manager. The agent is typically trained with a number of cycles for which the agent is authorized to negotiate without approval from the manager, and this number may be varied or overridden in response to an instruction from the agent manager.

Primary network 202 also receives as feedback a price offer delta signal related to the change in the agent's last and current offers, and a send message signal and a undisguised message signal related to the last message sent from the agent to the client. Each of these signals are output from network 202 (FIG. 8b).

As shown in FIG. 8b, primary network 202 outputs a number of other signals in response to the inputs shown in FIG. 8a. A set of filters 226–234 condition these output signals from neural network levels to levels that are more useful external to the primary network.

A negotiation message creator filter 226, which is implemented in this embodiment as procedural logic, receives an output signal from network 202 and any value from the price offer generator 228 and outputs a message to the other party. The output message may include a number of possible messages, such as accept, reject, counteroffer, wait request, and negotiations finished, among others. The format of the message may follow a predetermined protocol that is understandable to the other party.

A price offer generator filter 228, which is also implemented in procedural logic in this embodiment, receives a price offer delta parameter and the value previously stored in my last offer block 224 and outputs therefrom the current price offer which is stored in register 224. The price offer delta parameter is also fed back to primary network 202 as described above.

The current offer may be supplied in conjunction with the message to the other party provided by filter 226. In addition, the current offer may also operate as a public offer which can be polled by other agents wishing to engage in negotiations with agent 100. The current offer may also be output to a market or bulletin board set up on an agent host to solicit negotiations with other parties.

An adjust iteration filter 230, which in this embodiment is implemented with procedural logic, receives an iteration increment signal to increment register 218 in response thereto. Filter 230 also receives a reset signal to reset register 218 in response to an increase in iterations authorized instruction.

In addition, an increment processor filter 232, implemented in this embodiment with procedural logic, receives a change increment signal and an increment value signal. In response to a suitable change increment signal, the increment value represented by the increment value signal is output in filtered form and stored in register 216.

A message creator filter 234, which is implemented as procedural logic in this embodiment, is used to output disguised messages to the agent's client in the manner discussed above. Filter 234 receives a send message signal as well as a signal for the disguised message to send. As discussed above, the undisguised message is typically one of several messages such as: "probable acceptable alternative, do you accept", "iterations exceeded, recommend continue", "iterations exceeded, recommend withdrawal", "recommend immediate withdrawal", a dummy transmission to motivate negotiation, and "request approval to increase offer", among others. The send message signal initiates the transmission of a disguised message for the given message output by primary network 202.

The decoded selector signal sel is also received as input to block 234 as well as unfiltered selector values for inclusion in the message as needed. Other value signals, such as the current and/or last prices offered by the other party and stored in registers 220, 222, and the product characteristics supplied to filter 214, may also be received as input for incorporation in the message to the manager.

In response to these inputs, filter 234 outputs a message to the agent manager. The message may be text, binary or other data formats which are recognizable by the agent manager. For example, the message may be a textual message representative of one of the undisguised messages, but with the selector indicating another message than that represented by the undisguised message (e.g., with a certain selector, "recommend immediate withdrawal" may be interpreted by the agent manager to mean "probable acceptable alternative, do you accept").

It should be appreciated that in the illustrated embodiment of module 200, the decision making and message disguising functions of agent 100, which may be conceptually considered to be performed by separate decision making and message disguising modules or mechanisms (e.g., as illustrated by blocks 134 and 141 in FIG. 7), are both principally implemented in primary network 202. It should also be appreciated that the functions may be separated into different neural networks in the alternative. Moreover, it should be appreciated that primary network 202 may also be implemented via an interconnected network of separate neural networks.

As a component of its decision making function, primary network 202 may implement a number of negotiation strategies consistent with the invention. For example, U.S. Patent application Ser. No. 08/821,935, entitled "INTELLIGENT AGENT WITH NEGOTIATION CAPABILITY AND METHOD OF NEGOTIATION THEREWITH", which has been incorporated by reference, discloses a negotiation strategy which relies on the previous and current offers from the agent as well as the previous and current prices offered by the other party. A number of additional negotiation features suitable for use by primary network 202 are also implemented in the aforementioned application, including dynamic value determination, disguising negotiation strategy by randomizing an agent's behavior, and limiting unproductive negotiations by constraining an agent's behavior, among others. Other negotiation strategies and features may also be used consistent with the invention.

A wide variety of known neural network designs may be used for primary neural network 202 and any of the illustrated network filters consistent with the invention. For example, one suitable neural network design is a back propagation neural network known in the art. Other neural network designs, including a radial basis function network, among others, may also be used in the alternative. A suitable development environment for performing the development and training of such neural networks is the IBM Neural Network Utility available from International Business Machines Corporation, among others.

Training for the networks in module 200 is performed via the Supervised training process for neural networks, with the exception of the additional input provided by the decoded selector signal. Each neural network/filter in module 200 may be trained separately, although the training process is significantly simplified if the entire module 200 is trained at once using combined training records.

Figure 9:
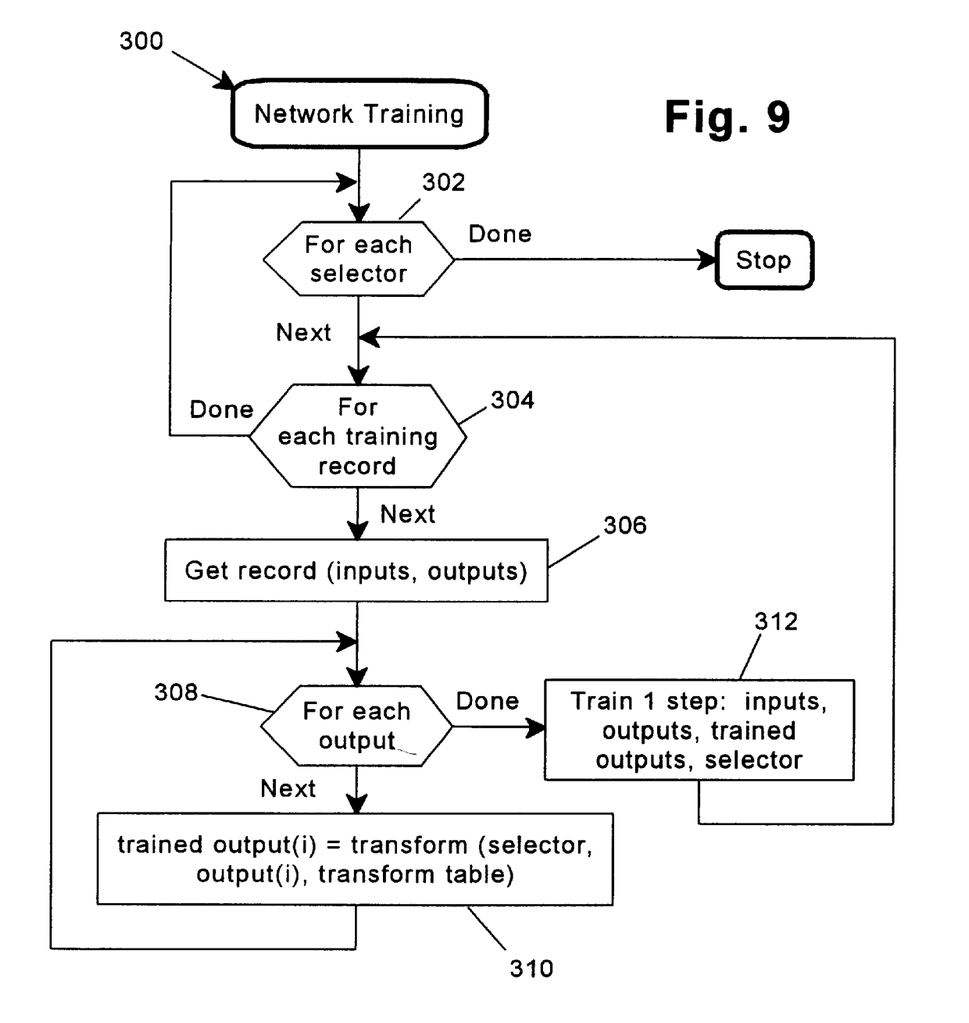
FIG. 9 is a flowchart illustrating the program flow of a network training routine for use in training the neural network in the intelligent agent of FIGS. 8a and 8b.

For example, one suitable process for training module 200 is illustrated by network training routine 300 in FIG. 9. Generally, the program flow includes three nested for-next loops. The first for-next loop, illustrated at block 302, cycles through each possible value of the selector(s). For each value, a second for-next loop, illustrated at block 302, cycles through each training record.

For each training record, the record is obtained in block 306. A suitable training record may have the general format illustrated in Table II above.

Next, a third for-next loop, illustrated at block 308, cycles through each output in the record, and at block 310, generates a trained output value using a transform function that is based upon the current value of the selector, and the desired output. The trained output is retrieved using a transform table, e.g., as illustrated by Table I above, where a disguised message is selected from a set of messages to represent a desired output.

Once suitable disguised (trained) outputs have been generated for a training record, block 308 passes control to block 312 to train the neural network using the training record, current selector and the disguised outputs.

After the training record is used to train module 200, control then returns to block 304 to process the next training record. Program flow continues until module 200 has been trained with each training record, as modified for each value of the selector(s).

It should be appreciated that a primary benefit of routine 300 is that training is simplified since the need to generate separate training records for each selector value is eliminated. In the alternative, however, individual training records for each value of the selector may be generated, e.g., in the forms illustrated in Tables III–V above.

It is anticipated that module 200 of agent 100 may be trained by an agent manager to handle all possible situations, including all of the types of goods/services, etc. to be purchased or sold by the agent, whereby the agent manager merely dispatches the agent when negotiations are desired. In the alternative, the agent manager may train an agent with only the information related to a particular desired transaction immediately prior to dispatching the agent. This latter process may require additional time to dispatch an agent once a transaction is desired, however, the size and complexity of the agent may be significantly reduced if the agent is more narrowly focused.

It should be appreciated that beyond decision making and disguising messages, other functionality may be required for the autonomous operation of agent 100, and that such additional functionality may be implemented via procedural logic and/or neural networks, whether incorporated within negotiation module 200 or in a separate program module. For example, functions such as initialization, maintenance, finding other agents or markets to interact with, etc. may also be utilized. However, as these functions relate more to the basic operation of an agent, which is in general known in the art, these functions will not be discussed in any greater detail herein.

Other modifications will be apparent to one skilled in the art. Therefore, the invention lies solely in the claims hereinafter appended.

What is claimed is:

1. A method of communicating between an intelligent agent computer program and a client computer process, comprising the steps of:

(a) selecting a message from a plurality of messages based upon a selector and information to be transmitted between the intelligent agent and the client computer process to disguise the information from discovery by a third party; and (b) transmitting the selected message between the intelligent agent and the client computer process.

2. The method of claim 1, wherein the selecting and transmitting steps are performed in the intelligent agent, and wherein the method further comprises the step of determining the information to be transmitted using a neural network into which has been programmed a decision logic for the intelligent agent.

3. The method of claim 2, wherein the selecting step includes the step of selecting the message using a neural network into which has been programmed a transform table for matching a message with the information to be transmitted.

4. The method of claim 3, wherein the intelligent agent is configured to conduct negotiations in an electronic commerce application, wherein the decision logic for the intelligent agent includes a negotiation strategy, and wherein the information to be transmitted by the intelligent agent includes at least one of the group consisting of probable acceptable alternative do you accept, iterations exceeded recommend continue, iterations exceeded recommend withdrawal, recommend immediate withdrawal, request approval to increase offer, and a dummy transmission to motivate negotiation.

5. The method of claim 1, wherein the selector includes a predetermined parameter known to both of the intelligent agent and the client computer process.

6. The method of claim 5, wherein the selector is changed after a predetermined number of transmissions between the intelligent agent and the client computer process.

7. The method of claim 1, wherein the selector is transmitted between the intelligent agent and the client computer process.

8. The method of claim 1, wherein the selector is derived from an existing parameter having another purpose.

9. The method of claim 8, wherein the selector is derived from a time stamp appended to the selected message transmitted between the intelligent agent and the client computer process.

10. The method of claim 1, wherein each of the plurality of messages has a plurality of alternate meanings which are selected based upon the selector.

11. The method of claim 1, wherein the selecting step includes the step of selecting at least one additional message from the plurality of messages, and wherein the transmitting step includes the step of additionally transmitting the additional message between the intelligent agent and the client computer process;

whereby the selector controls which of the transmitted messages includes the information to be transmitted.

12. The method of claim 1, wherein the selecting step includes the step of selecting each message from the plurality of messages with the exception of an omitted message corresponding to the information to be transmitted, and wherein the transmitting step includes the step of transmitting every message in the plurality of messages except for the omitted message.

13. The method of claim 1, wherein the selecting step includes the step of determining the message to select using a transform table indexed by the selector and the information to be transmitted.

14. The method of claim 1, wherein the message transmitted in the transmitting step is unscrambled.

15. A method of communicating with an intelligent agent computer program, the method comprising the steps of:

(a) processing with a neural network an input received from an external source and thereby generating an output therefrom;

(b) disguising the output in an output message selected from a plurality of messages based upon the output and a selector; and (c) transmitting the output message.

16. The method of claim 15, wherein the disguising step is performed using a neural network.

17. The method of claim 16, wherein the processing and disguising steps are performed using the same neural network.

18. A method of communicating between an intelligent agent computer program and a client computer process, comprising the steps of:

(a) receiving a disguised message transmitted between the intelligent agent and the client computer process, the disguised message selected from a plurality of messages, each of which is related to predetermined information based upon a selector;

(b) determining the selector; and (c) interpreting the disguised message using the selector to determine the predetermined information transmitted in the disguised message.

19. A program product comprising:

(a) a program configured to perform a method of communicating between an intelligent agent computer program and a client computer process, the method comprising the steps of:

(1) selecting a message from a plurality of messages based upon a selector and information to be transmitted between the intelligent agent and the client computer process to disguise the information from discovery by a third party; and (2) transmitting the selected message between the intelligent agent and the client computer process; and (b) a signal bearing media bearing the program.

20. The program product of claim 19, wherein the signal bearing media is transmission type media.

21. The program product of claim 19, wherein the signal bearing media is recordable media.

22. An apparatus for communicating with one of an intelligent agent computer program and a client computer process, the apparatus comprising:

(a) a decision logic mechanism, configured to receive an input from an external source and generate therefrom an output; and (b) a message disguising mechanism, configured to receive the output of the decision logic mechanism and output a selected message from a plurality of messages as a disguised message in response to a selector and the output of the decision logic mechanism.

23. The apparatus of claim 22, wherein the decision logic mechanism is incorporated in an intelligent agent computer program, and wherein the decision logic mechanism includes a neural network into which has been programmed a decision logic for the intelligent agent.

24. The apparatus of claim 23, wherein the message disguising mechanism includes a neural network into which has been programmed a transform table for matching a message with the information to be transmitted.

25. The apparatus of claim 24, wherein the decision logic mechanism and the message disguising mechanism are incorporated into the same neural network.

26. The apparatus of claim 23, wherein the decision logic mechanism further comprises a plurality of neural network filters for conditioning inputs and outputs to and from the neural network.

27. The apparatus of claim 23, wherein the intelligent agent is configured to conduct negotiations in an electronic commerce application, and wherein the neural network is programmed with a negotiation strategy for the intelligent agent.

28. The apparatus of claim 22, wherein the selector includes a predetermined parameter known to both of the intelligent agent and the client computer process.

29. The apparatus of claim 22, wherein the selector is transmitted between the intelligent agent and the client computer process.

30. The apparatus of claim 22, wherein the selector is derived from an existing parameter having another purpose.

31. A method of communicating between an intelligent agent computer program and a client computer process, comprising the steps of:

(a) determining information to be transmitted using a neural network into which has been programmed a decision logic for the intelligent agent;

(b) selecting a message from a plurality of messages based upon a selector and the information to be transmitted between the intelligent agent and the client computer process; and (c) transmitting the selected message between the intelligent agent and the client computer process; wherein the selecting and transmitting steps are performed in the intelligent agent.

32. A method of communicating between an intelligent agent computer program and a client computer process, comprising the steps of:

(a) selecting a message from a plurality of messages based upon a selector and information to be transmitted between the intelligent agent and the client computer process, wherein each of the plurality of messages has a plurality of alternate meanings which are selected based upon the selector; and (b) transmitting the selected message between the intelligent agent and the client computer process.

33. An apparatus for communicating with one of an intelligent agent computer program and a client computer process, the apparatus comprising:

(a) a decision logic mechanism incorporated in an intelligent agent computer program, the decision logic mechanism configured to receive an input from an external source and generate therefrom an output, and the decision logic mechanism including a neural network into which has been programmed a decision logic for the intelligent agent computer program; and (b) a message disguising mechanism, configured to receive the output of the decision logic mechanism and output one of a plurality of messages as a disguised message in response to a selector and the output of the decision logic mechanism.

* * * * *